United States Patent
Chen

(10) Patent No.: US 11,242,938 B2
(45) Date of Patent: Feb. 8, 2022

(54) INTERNAL ENGAGEMENT STRUCTURE OF HOUSING FOR WATER CONTROL VALVE

(71) Applicant: CHUAN WEI METAL CO., LTD., Changhua County (TW)

(72) Inventor: Chi-Chuan Chen, Changhua County (TW)

(73) Assignee: CHUAN WEI METAL CO., LTD., Changhua County (TW)

( * ) Notice: Subject to any disclaimer, the term of this patent is extended or adjusted under 35 U.S.C. 154(b) by 2 days.

(21) Appl. No.: 16/795,312

(22) Filed: Feb. 19, 2020

(65) Prior Publication Data

US 2021/0254741 A1 Aug. 19, 2021

(51) Int. Cl.
*F16K 25/00* (2006.01)
*F16K 27/08* (2006.01)
*F16K 27/02* (2006.01)
*F16K 27/12* (2006.01)

(52) U.S. Cl.
CPC .......... *F16K 27/08* (2013.01); *F16K 27/0227* (2013.01); *F16K 27/12* (2013.01); *Y10T 137/6017* (2015.04); *Y10T 137/86823* (2015.04)

(58) Field of Classification Search
CPC ....... Y10T 137/86823; Y10T 137/6017; F16K 11/0743
See application file for complete search history.

(56) References Cited

U.S. PATENT DOCUMENTS

| | | | | |
|---|---|---|---|---|
| 2009/0266423 A1* | 10/2009 | Chen | ................... | F16K 11/0743 137/315.13 |
| 2013/0098474 A1* | 4/2013 | Tung | ....................... | F16K 11/07 137/98 |
| 2014/0345729 A1* | 11/2014 | Chang | ................... | F16K 11/076 137/625.15 |
| 2014/0345730 A1* | 11/2014 | Chang | ..................... | F16K 35/04 137/625.17 |
| 2016/0237662 A1* | 8/2016 | Chang | ................... | F16K 27/045 |
| 2017/0108127 A1* | 4/2017 | Chang | ..................... | F16K 27/04 |

* cited by examiner

*Primary Examiner* — Robert K Arundale
(74) *Attorney, Agent, or Firm* — Chun-Ming Shih; Lanway IPR Services

(57) ABSTRACT

An internal engagement structure of a housing for a water control valve, the water control valve including the housing and a valve assembly, and the housing contains: a holder and a cover. The holder is configured to accommodate the valve assembly, and the cover is covered on the holder. The holder includes two opposite receiving grooves, two locking recesses formed on two lower ends of the two opposite receiving grooves respectively and communicating with the holder, and two tilted guide faces arranged on two upper ends of the two opposite receiving grooves respectively. The cover includes two opposite retainers extending downward from a bottom thereof and corresponding to the two opposite receiving grooves respectively, two hooks formed on two lower ends of the two opposite retainers respectively, and two cutouts defined above the two hooks respectively and configured to accommodate the two tilted guide faces respectively.

1 Claim, 6 Drawing Sheets

INTERNAL ENGAGEMENT STRUCTURE OF HOUSING FOR WATER CONTROL VALVE

FIELD OF THE INVENTION

The present invention relates to an internal engagement structure of a housing for a water control valve which is applied to avoid a removal of the cover by ways of the two opposite retainers of the cover and the two opposite receiving grooves of the holder, thus fixing the valve assembly in the holder tightly.

BACKGROUND OF THE INVENTION

A conventional water control valve contains a valve assembly which has a water distribution sheet, an inlet valve disc, an outlet valve disc, a ball valve element, a fixing bolt, and an operation lever, the valve assembly is accommodated in a housing for the water control valve so that the water control valve is connected inside water supply equipment.

The water control valve is packed in a transparent package case so as to be replaceable easily after the water supply equipment is broken.

Referring to FIGS. 1-3, a housing for the water control valve contains: a holder 10 and a cover 20.

The holder 10 is configured to accommodate a valve assembly 30.

The cover 20 includes two opposite retainers 21, two contacting tabs 22 extending from the two opposite retainers 21 respectively, two arcuate engagement portions 23 formed on two bottoms of the two opposite retainers 21 respectively, and two notches 24 defined on the two opposite retainers 21 respectively.

The holder 10 includes two opposite recesses 11 defined on two outer walls thereof respectively and corresponding to the two opposite retainers 21 respectively, and the holder 10 includes the two locking ribs 12 arranged in the two opposite recesses 11 respectively, wherein a size of a respective one locking rib 12 correspond to a size of a respective one notch 24.

The valve assembly 30 is accommodated in the holder 10, and the cover 20 is covered on the holder 10 so that the two opposite retainers 21 are engaged in the two opposite recesses 11 of the holder 10 respectively, and the two notches 24 of the two opposite retainers 21 are retained with the two locking ribs 12 of the two opposite recesses 11 respectively, thus fixing the valve assembly 30, the holder 10, and the cover 20.

However, the two opposite retainers of the cover respectively remove from the two locking ribs of the holder easily when shipping the water control valve, thus causing damage of the water control valve.

The present invention has arisen to mitigate and/or obviate the afore-described disadvantages.

SUMMARY OF THE INVENTION

The primary aspect of the present invention is to provide an internal engagement structure of a housing for a water control valve which is applied to avoid a removal of the cover by ways of the two opposite retainers of the cover and the two opposite receiving grooves of the holder, thus fixing the valve assembly in the holder tightly.

Further aspect of the present invention is to provide an internal engagement structure of a housing for a water control valve by which the valve assembly is accommodated in the holder, and the cover is covered on the holder so that the two opposite retainers are inserted into the two opposite receiving grooves respectively, and the two hooks of the two opposite retainers are engaged with the two locking recesses of the receiving grooves respectively, thus fixing the valve assembly, the holder, and the cover securely.

Another aspect of the present invention is to provide an internal engagement structure of a housing for a water control valve which is capable of enhancing quality greatly.

DETAILED DESCRIPTION OF THE PREFERRED EMBODIMENTS

Figure 1:
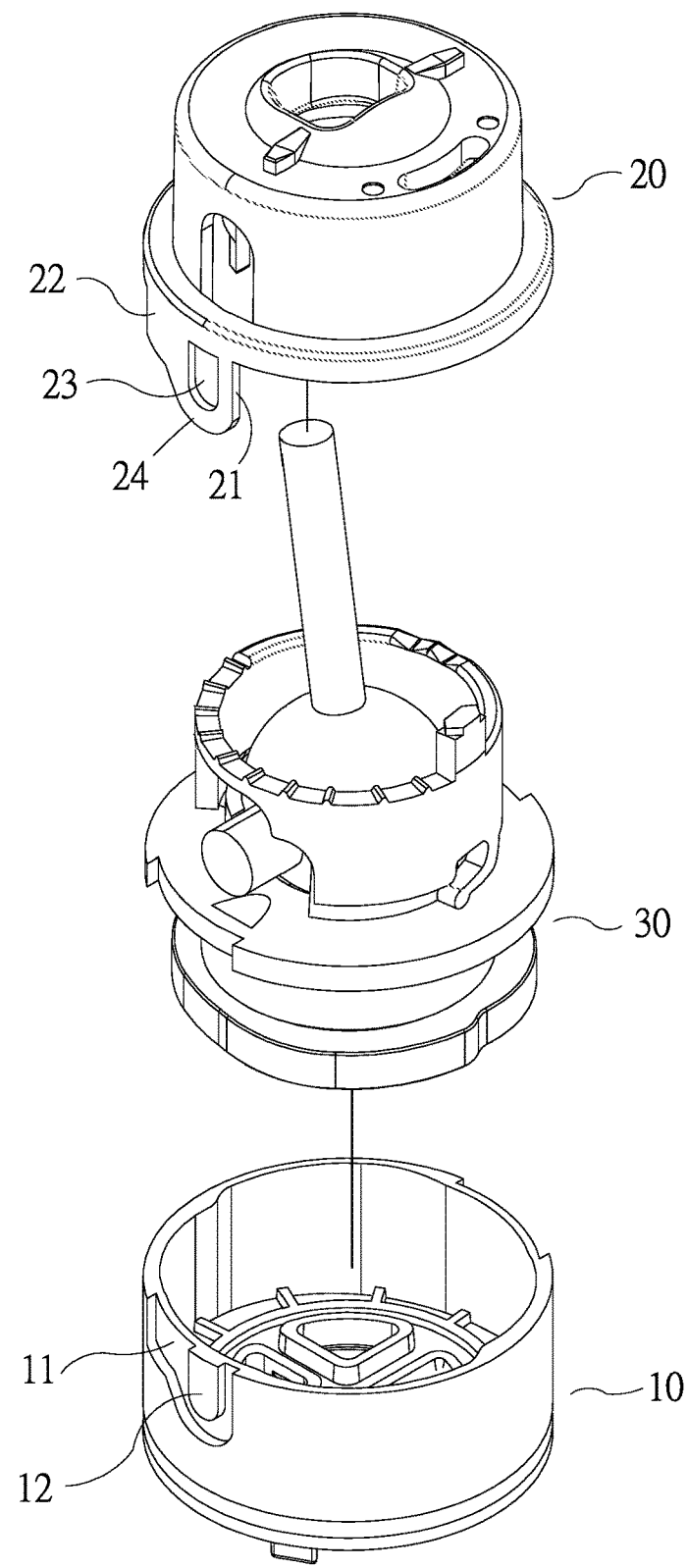
FIG. 1 is a perspective view showing the exploded components of a conventional water control valve.
Figure 3:
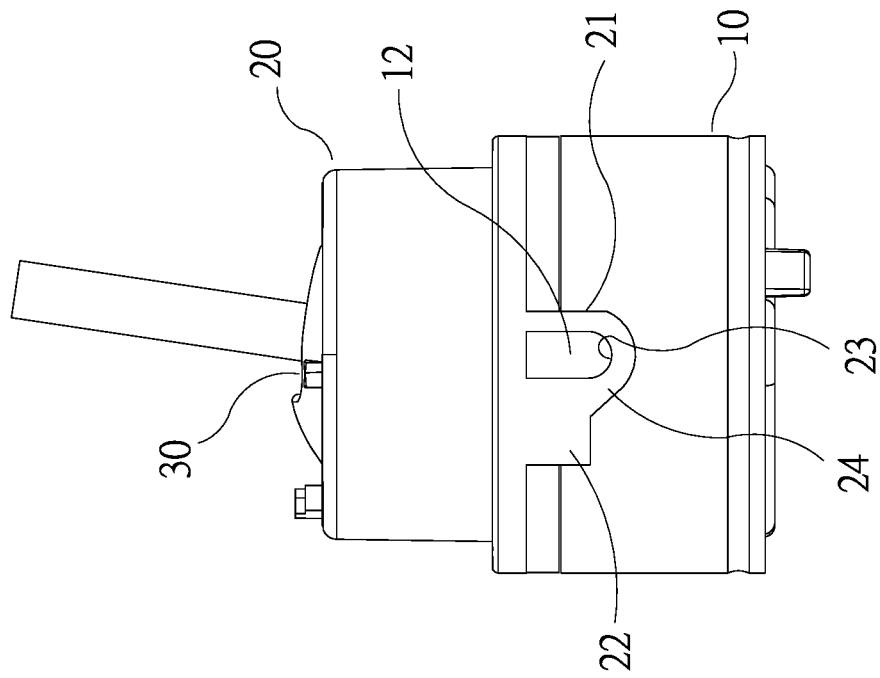
FIG. 3 is a side plan view showing the assembly of the conventional water control valve.
Figure 2:
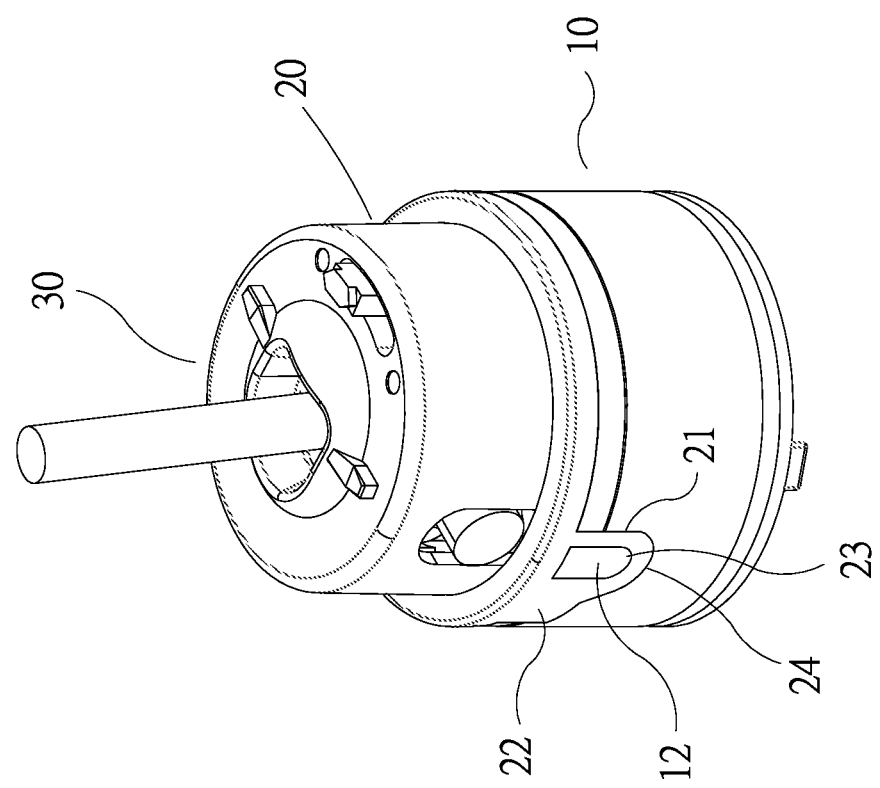
FIG. 2 is a perspective view showing the assembly of the conventional water control valve.
Figure 4:
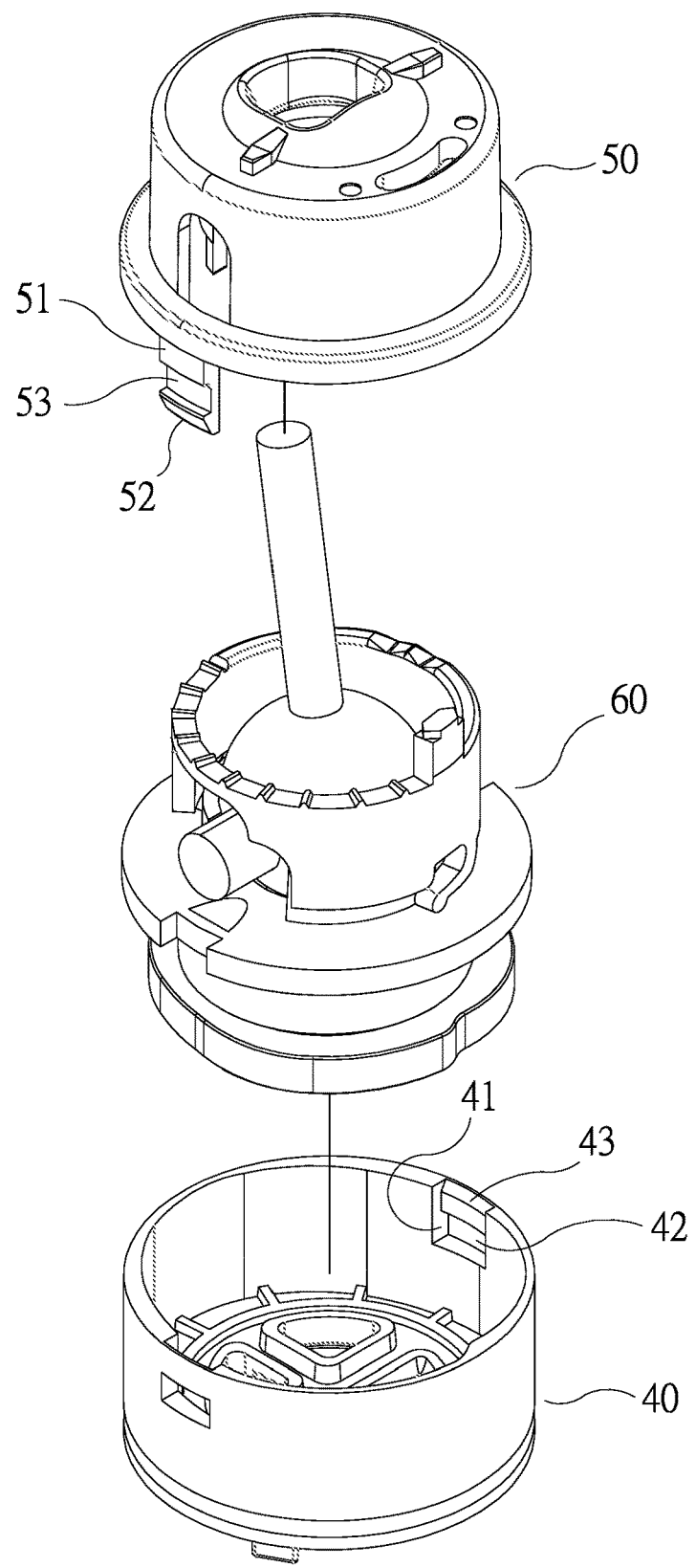
FIG. 4 is a perspective view showing the exploded components of an internal engagement structure of a housing for a water control valve according to a preferred embodiment of the present invention.
Figure 5:
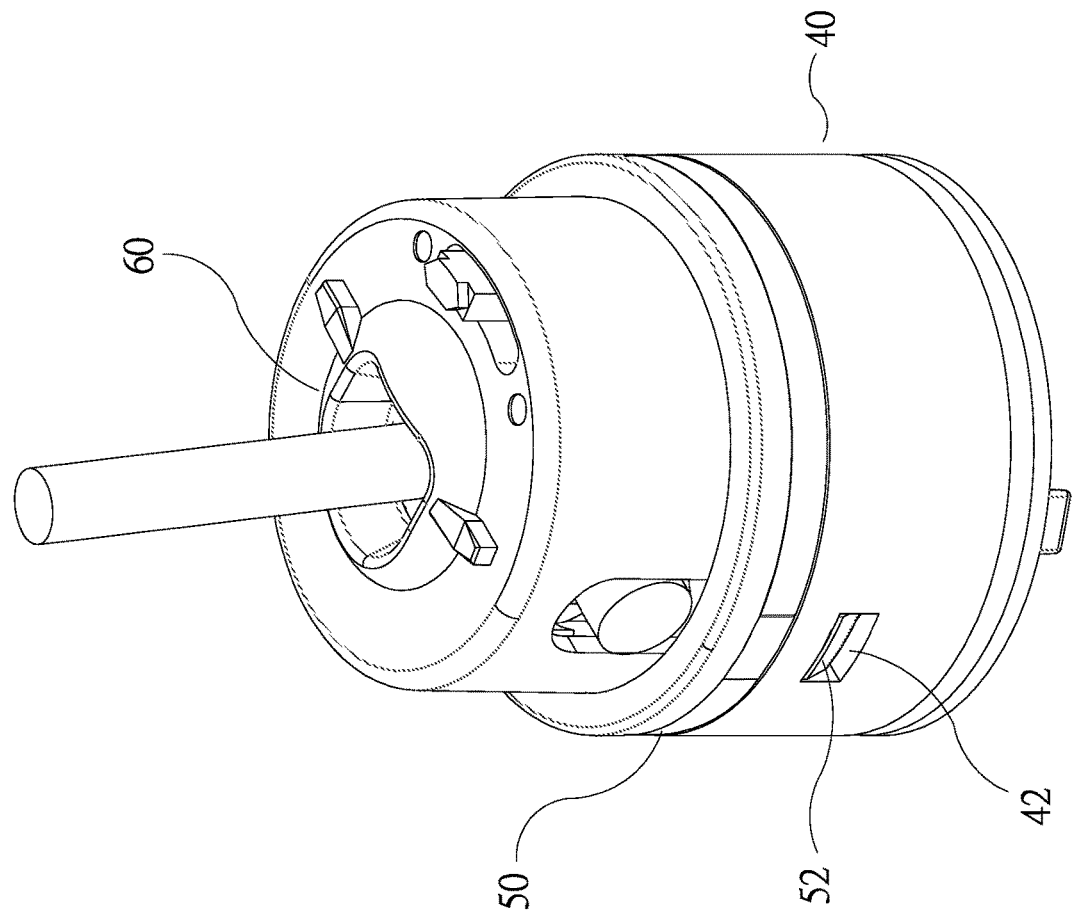
FIG. 5 is a perspective view showing the assembly of the internal engagement structure of the housing for the water control valve according to the preferred embodiment of the present invention.
Figure 6:
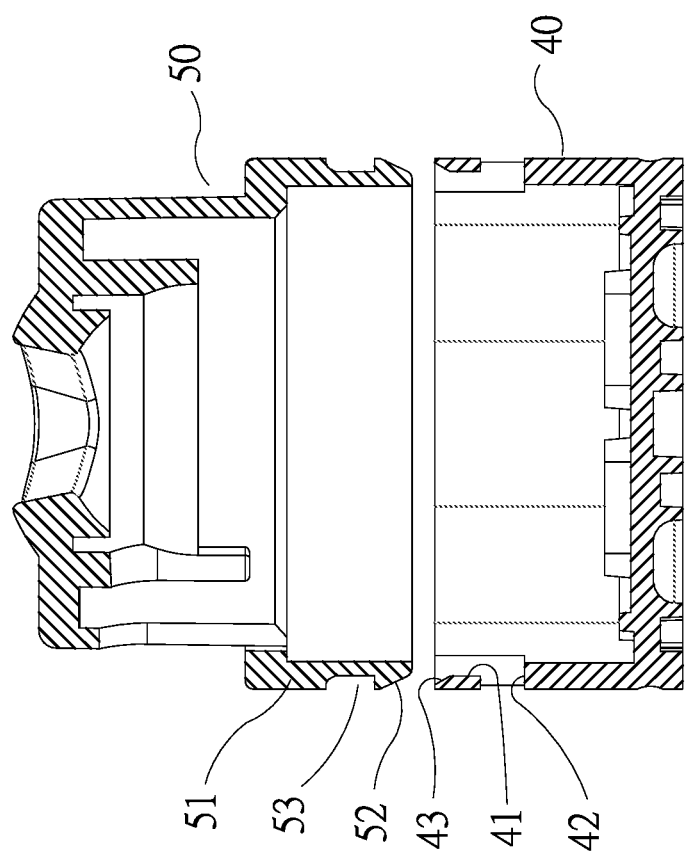
FIG. 6 is a cross sectional view showing the assembly of the internal engagement structure of the housing for the water control valve according to the preferred embodiment of the present invention.
Figure 8:
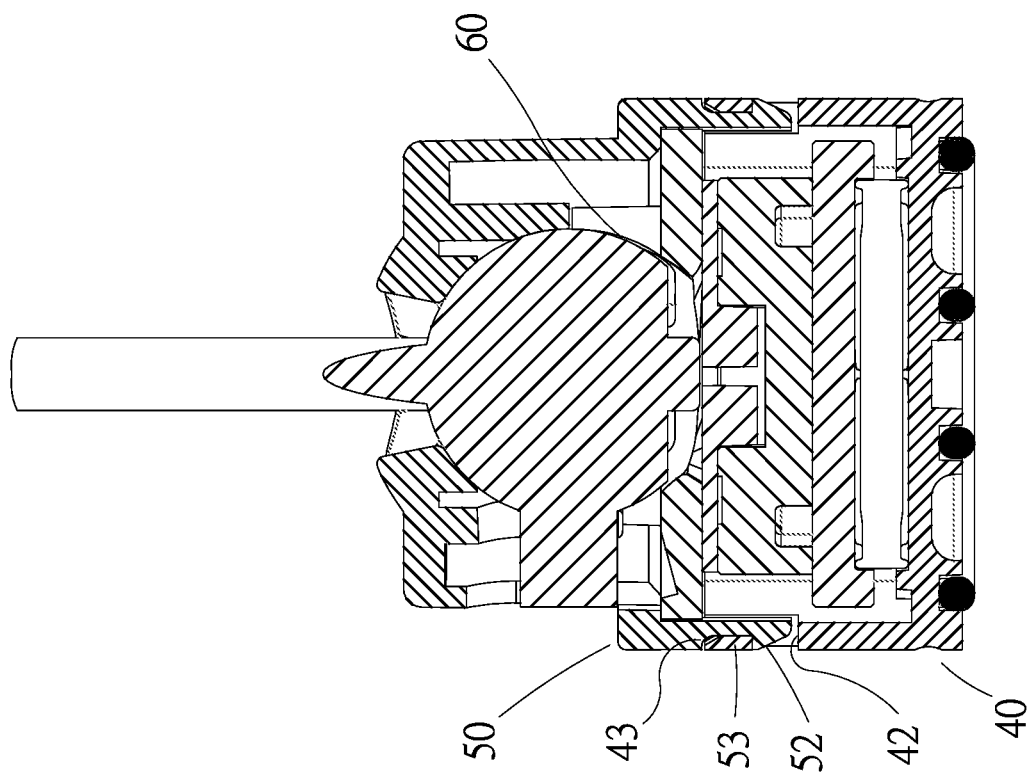
FIG. 8 is a cross sectional view showing the assembly of the internal engagement structure of the housing for the water control valve according to the preferred embodiment of the present invention.
Figure 7:
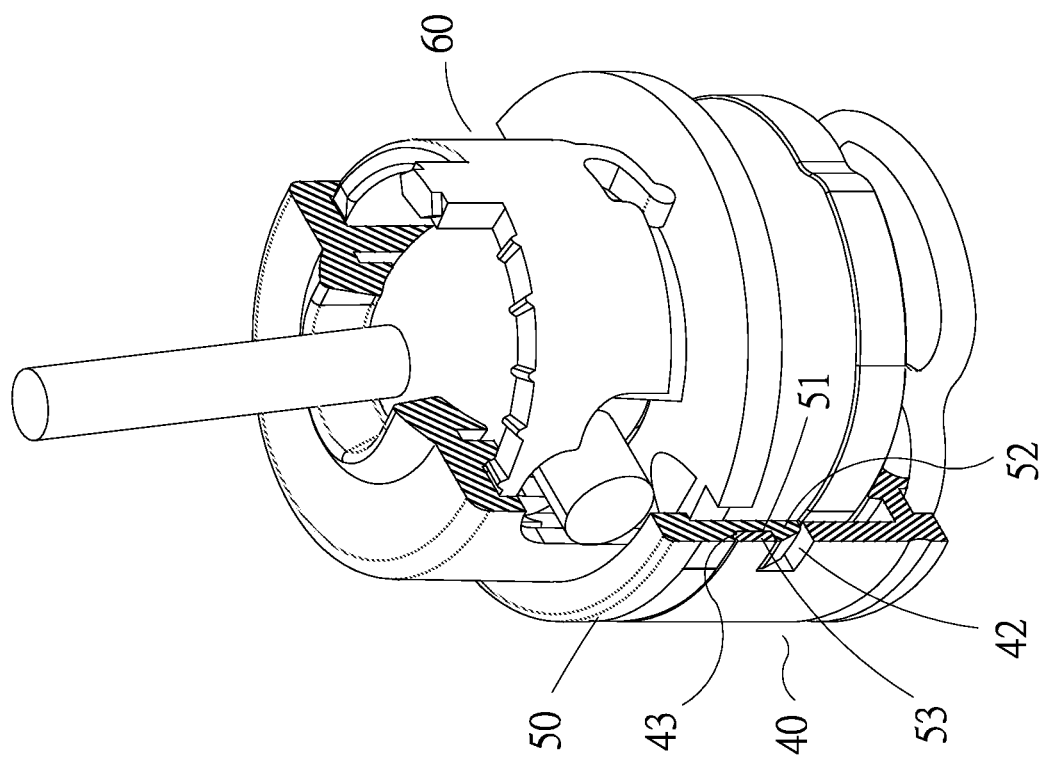
FIG. 7 is a cross-sectional perspective view showing the assembly of a part of the internal engagement structure of the housing for the water control valve according to the preferred embodiment of the present invention.

With reference to FIGS. 4-8, an internal engagement structure of a housing for a water control valve according to a preferred embodiment of the present invention comprises: a holder 40 and a cover 50.

The holder 40 is configured to accommodate a water distribution sheet, an inlet valve disc, an outlet valve disc, a ball valve element, a fixing bolt, and an operation lever of a valve assembly 60 (since these components of the valve assembly 60 are well-known arts, further remarks are omitted) and is connected with the cover 50.

The holder 40 includes two opposite receiving grooves 41 defined on an inner wall thereof, two locking recesses 42 formed on two lower ends of the two opposite receiving grooves 41 respectively and communicating with an outer wall of the holder 40, and two tilted guide faces 43 arranged on two upper ends of the two opposite receiving grooves 41 respectively.

The cover 50 includes two opposite retainers 51 extending downward from a bottom thereof and corresponding to the two opposite receiving grooves 41 respectively, two hooks 52 formed on two lower ends of the two opposite retainers 51 respectively, and two cutouts 53 defined above the two hooks 52 respectively and configured to contact with the two tilted guide faces 43 respectively.

In assembly, the two opposite retainers 51 are inserted into the two opposite receiving grooves 41 respectively so that the two hooks 52 of the two opposite retainers 51 are engaged with the two locking recesses 42 of the receiving grooves 41 respectively, thus connecting the holder 40 and the cover 50.

The valve assembly 60 is accommodated in the holder 40, and the cover 50 is covered on the holder 40 so that the two opposite retainers 51 are inserted into the two opposite receiving grooves 41 respectively, and the two hooks 52 of the two opposite retainers 51 are engaged with the two locking recesses 42 of the receiving grooves 41 respectively, thus fixing the valve assembly 60, the holder 40, and the cover 50 securely.

Thereby, the internal engagement structure of the housing is applied to avoid a removal of the cover by ways of the two opposite retainers of the cover and the two opposite receiving grooves of the holder, thus fixing the water control valve in the holder tightly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An internal engagement structure of a housing for a water control valve, the water control valve including the housing and a valve assembly accommodated in the housing, and the housing comprising: a holder and a cover; the holder being configured to accommodate the valve assembly, and the cover being covered on the holder, thus connecting the water control valve;

wherein the holder includes two opposite receiving grooves defined on an inner wall thereof, and the holder includes two locking recesses formed on two lower ends of the two opposite receiving grooves respectively and communicating with an outer wall of the holder, two tilted guide faces arranged on two upper ends of the two opposite receiving grooves respectively;

wherein the cover includes two opposite retainers extending downward from a bottom thereof and corresponding to the two opposite receiving grooves respectively, a cutout is formed on each of the two opposite retainers to define a hook at one end of the retainer and a blocking portion at the other end of the retainer, and the two cutouts are configured to accommodate the two tilted guide faces respectively;

wherein the two opposite retainers of the cover are inserted into the two opposite receiving grooves of the holder respectively so that the two hooks of the two opposite retainers are engaged with the two locking recesses of the receiving grooves respectively, thus connecting the holder and the cover, and wherein an apex of each of the two hooks is in flush with an outer surface of the holder.

* * * * *